Sept. 3, 1963   D. A. WORDEN ETAL   3,102,549
PRESSURE REGULATOR WITH AUTOMATIC RELIEF VALVE
Filed May 20, 1960
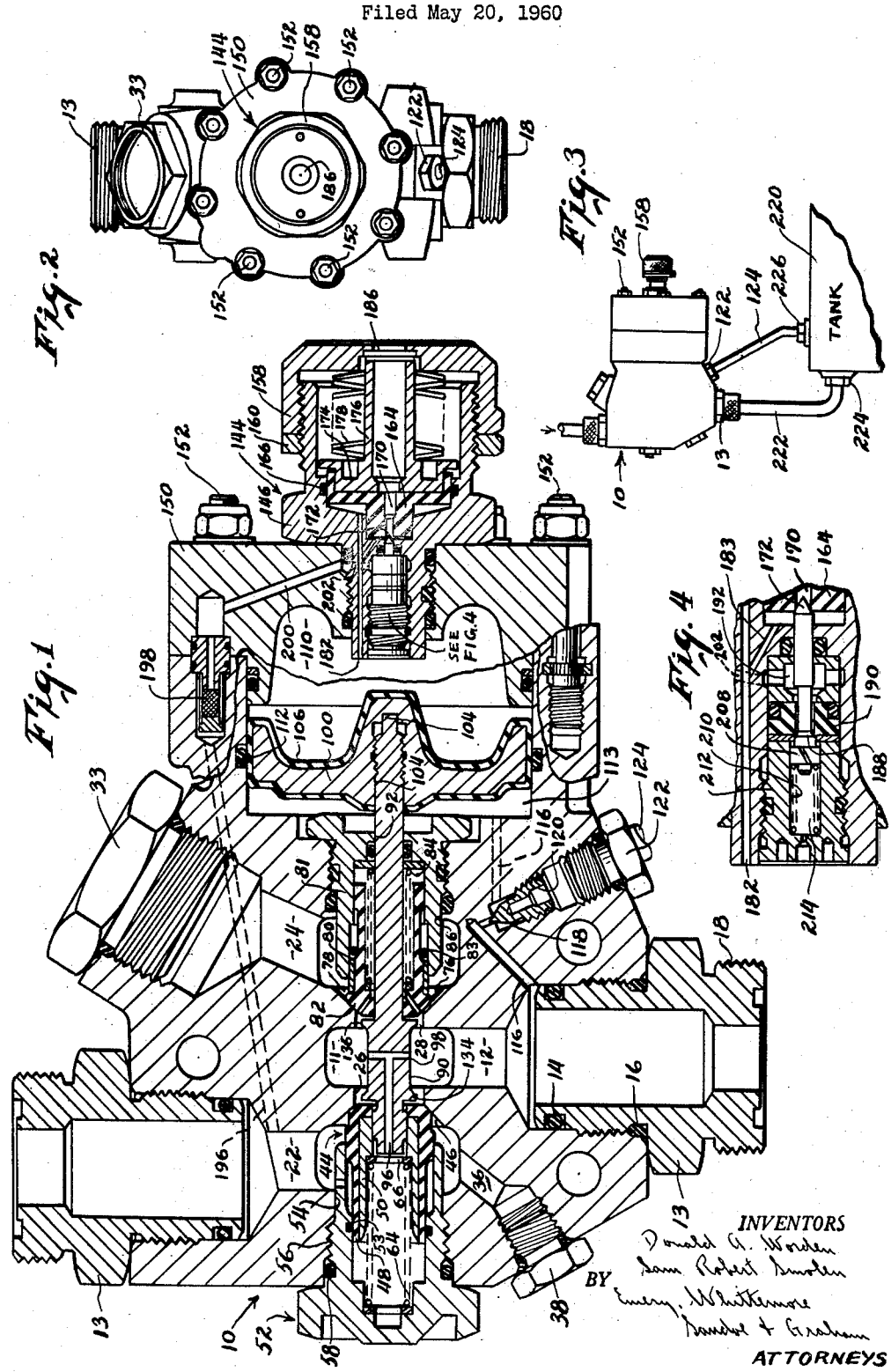
INVENTORS
Donald A. Worden
Sam Robert Snoden
Emery Whittemore
BY Sandoe & Graham
ATTORNEYS

United States Patent Office

3,102,549
Patented Sept. 3, 1963

3,102,549
PRESSURE REGULATOR WITH AUTOMATIC
RELIEF VALVE
Donald A. Worden, 99 West End Ave., Pompton Plains,
N.J., and Sam Robert Smolen, 119 Vreeland Ave.,
Bloomingdale, N.J.
Filed May 20, 1960, Ser. No. 30,579
9 Claims. (Cl. 137—116.3)

This invention relates to pressure regulators and more especially to regulators having an extremely wide range of pressure adjustment.

It is an object of the invention to provide an improved pressure regulator controlled by sensing pressure in a pressure regulating chamber and adjustable to supply gas at reduced pressure over a range having an upper limit as high as ten times the lower limit. Another object of the invention is to provide a regulator of the character indicated with means for damping the operation of the regulator so as to maintain stable output pressure at all pressures within its range of adjustment.

Another object is to provide a pressure regulator having a wide operating range and having provisions for high gas flow, and for venting of excess pressure through passages of large cross sections. In the preferred embodiment of the invention there are valve head assemblies, one for controlling flow of gas into the regulator, and another for controlling escape of any excess pressure through a vent.

Features of the invention relate to the construction of guide bearings for the valve head assemblies and for an actuator that moves the valve head assemblies.

Other objects, features and advantages of the invention will appear or be pointed out as the description proceeds.

In the drawing, forming a part hereof, in which like reference characters indicate corresponding parts in all the views—

FIGURE 1 is a vertical sectional view through a pressure regulator made in accordance with this invention;

FIGURE 2 is an end view of the pressure regulator shown in FIGURE 1, the view being on a reduced scale;

FIGURE 3 is an assembly view, on a greatly reduced scale, showing the pressure regulator of FIGURES 1 and 2, connected with a gas storage tank; and FIGURE 4 is an enlarged, fragmentary, sectional view of a portion of the structure shown in FIGURE 1.

The pressure regulator shown in FIGURE 1 includes a housing 10 having a main chamber 11 therein. A passage 12 opens through a wall of the regulator housing directly into the main chamber 11. A fitting 13 screws into a counterbore of the passage 12 and has sealing rings 14 and 15 for preventing leakage of gas along the threads of the fitting 13. The seal 14 can be omitted when the regulator is for low pressure only; and the seal 16 can be omitted when the regulator is for high pressure. A conduit or tubing is attached to the fitting 13 by threads 18 with suitable sealing means well understood in the art.

There are two other passages 22 and 24 opening through a wall of the regulator housing 10. The passage 22 communicates with the main chamber 11 through an opening 26; and the passage 24 communicates with the main chamber 11 through a passage 28 at the opposite end of the main chamber from the passage 26. There is a fitting 13 screwed into a counterbore of the passage 22 and this fitting is of similar construction to the fitting in the passage 12.

A somewhat different fitting 33 is secured into a counterbore of the passage 24. This fitting 33 has no provisions for connecting another conduit or tubing with it and it is ordinarily used merely for holding a screen since the passage 24 is a vent passage, in the illustrated regulator. The passage 22 is the inlet passage through which gas at high pressure is supplied to the regulator; and the passage 12 is the outlet passage through which gas at reduced pressure flows from the regulator. There is another passage 36 leading to a counterbore which is closed by a plug 38. This passage 36 is intended for use with a pressure gauge when the regulator is so equipped.

A valve head assembly 44 contacts with a seat area 46 surrounding the opening 26. This valve head assembly 44 has a plastic outer shell surrounding a metal inner sleeve 50. The plastic shell 48 and the inner sleeve 50 are secured together and form integral parts of a composite construction. The outside surface of the valve head assembly 44 is cylindrical, and fits with a running fit in a bearing surface in a bushing 52, and is sealed with an O-ring 53. The diameter at the seat area is greater than at the O-ring 53 so that there is always a slight over-balancing toward closed position.

A cylindrical guide surface 54 in the housing 10 holds the bushing 52 concentric with the opening 26 and there are threads 56 on the bushing 52 and in the housing 10, outwardly from the guide surface 54, for advancing the bushing 52 inwardly to the guide surface 54 when the regulator is being assembled. A conventional sealing ring 58 prevents leakage of gas along the threads of the bushing 52.

When the bushing 52 is screwed into the wall of the regulator housing, until a flange at the head end of the bushing contacts with the outside surface of the regulator housing, the inner end of the bushing is still spaced a substantial distance from the head area 46; and the valve seat assembly 44 is urged inwardly against the seat area 46 by a coil spring 64 compressed between an end wall of bushing 52 and a washer 66 which bears against a shoulder on the inside of the sleeve 50 of the valve head assembly 44.

At the other end of the main chamber 11, there is a seat area 76 surrounding the opening 28 and there is a valve head assembly 78 which bears against the seat area 76 to prevent a flow of gas through the opening 28.

The head assembly 78 is of composite construction but somewhat different from the head assembly 44. It includes an outer metal sleeve 80 which slides in a bushing 81 with a running fit, and sealed by an O-ring 83. Within the sleeve 80, there is a portion of the head assembly 78 made of plastic and this plastic portion is indicated by the reference character 82. As in the case of the head assembly 44, it is the plastic portion which contacts with the seat area surrounding the opening leading into the main chamber 11.

The head assembly 78 is urged toward the seat area 76 by a spring 84 compressed between washers that bear against the end wall of the bushing 81 and a shoulder of the plastic portion 82 of the head assembly.

The bushing 81 is held in alignment with the opening 28 by a guide surface 86; and there are threads beyond this guide surface on the bushing and on the regulator housing for advancing the bushing inwardly through the guide surface 86 during assembly of the regulator. As in the case of the bushing 52 already described, the bushing 81 has a substantial clearance between its inner end and the seat area 76 when the bushing 81 is screwed in as far as it can go.

The valve head assemblies 44 and 78 are held in closed positions by the springs 64 and 84, already described; and they are moved into open positions by an actuator 90. This actuator extends through the main chamber 11 and extends through the head assemblies 44 and 78. At one end, the actuator 90 is supported by a bearing surface within the sleeve 50 of the head assembly 44. This provides a metal bearing surface for the left-hand area of the actuator 90 since the sleeve 50 is a metal insert in the head assembly 44. The actuator 90 extends through another metal bearing 92 in an end wall of the bushing 81.

There is a longitudinally-extending passage 96 in the actuator 90, and this passage 96 communicates with the main chamber 11 through a cross passage 98. These passages admit pressure behind the head assembly 44 from the main chamber 11 to obtain the overbalancing toward closed position already described.

Pressure from the main chamber 11 passes through passages 99 in the head assembly 78 to the space behind the head assembly. The diameter of the inside bore of the bushing 81 in which the head assembly 78 slides is slightly larger than the diameter of the seat area 76 so as to overbalance the head assembly 78 toward closed position.

At the right-hand end of the actuator 90, there is a piston 100 attached to the actuator by screw threads and centered on the actuator 90 by cylindrical counterbores 102 and 104 beyond the threads and at opposite ends of the threads. The piston 100 is coated with plastic 106, such as nylon, and it slides in a cylindrical portion of a sensing pressure or regulating pressure chamber 110. This coating permits the piston 100 to fit more closely in the cylindrical portion of the regulating pressure chamber of the housing 10; and there is a sealing ring 112 for providing additional protection against leakage of pressure past the piston 100.

Gas is supplied to a pressure chamber 113, in the left-hand side of the piston 100 from the reduced pressure side of the regulator through a passage 116. At an intermediate location between the ends of the passage 116, there is a change in the direction of the passage and there is a needle valve 118 which controls the rate of flow of gas through the passage. This needle valve screws into threads 120 in a bore through the wall of the housing. There is a fitting 122 screwed into the housing above the needle valve 118, and this fitting 122 can be removed whenever it is necessary to gain access to the needle valve for purposes of adjustment. In the preferred construction, there is a tubing 124 connected with the fitting 122 for purposes that will be explained in connection with FIGURE 3.

The purpose of the needle valve is to control the rate of flow through the bleed passage 116 so as to stabilize the operation of the regulator. By limiting the rate of flow through this bleed passage 116, there is a lag between the change in pressure in the passage 12 and the corresponding change in pressure in chamber 113 on the left-hand side of the piston 100. This damps the operation of the regulator and makes it stable even though the regulator has an extremely wide range of adjustment.

The sensing pressure on the right hand side of the piston 100 determines when the regulator will operate to admit more gas from the passage 22 to the reduced-pressure passage 12. It is the reduced pressure gas flowing through the bleed passage 116 to the left hand side of the piston 100 which determines when the regulator will close and prevent further flow of gas from the inner passage 22 to the reduced-pressure passage 12.

This operation of the regulator to admit additional gas in the passage and to shut it off when the pressure has built up to sufficient value is effected by axial movement of the actuator 90 in response to movement of the piston 100. There are shoulders 134 and 136 on the actuator 90 in the main chamber 11 and adjacent to the valve seat assemblies 44 and 78, respectively. The axial distance between the shoulders 134 and 136 is somewhat less than the axial spacing of the valve head assemblies 44 and 78, when these head assemblies are in their closed positions. This provides the regulator with some lost motion and further stabilizes its operation.

When the actuator 90 moves toward the left in FIGURE 1, the shoulder 134 advances into contact with the confronting end of the valve seat assembly 44; and further movement of the shoulder 134 toward the left displaces the head assembly 44 from the seat area 46 and opens a gap between the seat area and the head assembly to permit gas flow from the inlet passage 122 through the opening 26 and into the main chamber 11. From the main chamber 11 the gas flows directly into the outlet passage 12 and some of the gas flows through the bleed passage 116 if there is any increase in pressure in the outlet passage 12 above that existing in the bleed passage 116.

Whenever pressure of gas flowing through the bleed passage 116 to the regulating pressure chamber 110 is sufficient to move the piston 100 toward the right, the actuator 90 moves the shoulder 134 toward the right and permits the head assembly 44 to move toward the seat area 46. When the head assembly 44 makes contact with the seat area 46 further flow of gas from the inlet passage 22 is shut off.

If, at any time, the pressure in the main chamber 11 becomes substantially higher than the reduced pressure for which the regulator is adjusted, the actuator 90 moves toward the right in FIGURE 1, and the shoulder 136 displaces the head assembly 78 from the seat area 76 so as to permit gas from the main chamber 11 to escape through the vent passage 24.

Excessive pressure in the main chamber 11 may occur in two ways. One is from leakage past the head assembly 44 in the event that the head assembly becomes damaged or for any other reason fails to prevent the flow of gas from passage 22 when no further flow should occur; and the other is when the regulator is adjusted for a substantially lower pressure than is existing in the main chamber 11 at the time that the lower adjustment is made. It will be evident that any substantial reduction in pressure on the right hand side of the piston 100, below that existing on the left hand side of the piston will cause the piston to move toward the right and shift the head assembly 78 into open position to permit venting of the pressure in excess of the new adjustment of the regulator.

The sensing pressure within the chamber 110 is raised or lowered by a sensing-pressure control assembly 144. This control assembly includes a fitting 146 which screws into an end cover 150 attached to the rest of the regulator housing by a circle of bolts 152. This fitting 146 is screwed tightly into threads in an opening through the end wall 150. There is a knob 158 screwed over the outside of the outer end of the fitting 146. Rotation of this knob 158 in one direction raises the sensing pressure in the regulator, and rotation of the knob 158 in the other direction lowers the sensing pressure. There is a locking nut 160 for holding the knob 158 in any adjusted position.

Within the fitting 146 there is a plastic piston element 164 which slides in a cylindrical chamber in the fitting 146. A sealing ring 166 prevents leakage of gas around the outside of the piston element 164; but there is an outlet passage 170 through the center of the piston element 164 and this outlet passage 170 is commanded by a needle valve 172. The end of the passage 170, with which the needle valve 172 contacts, is a valve seat movable toward and from a valve element consisting of the poppet valve 188 at one end and the needle valve 172 at the other end. The piston element 164 constitutes a movable wall of a control pressure chamber.

During the ordinary operation of the regulator, the plastic piston element 164 is held against the needle valve 172 so that no gas can escape through the passage 170. A backing plate 174 fits within the piston element 164 and this backing plate has a sleeve portion 176 which extends outwardly away from the piston element 164. There are spring washers 178 located between the backing plate 174 and the inner end face of the knob 158. When the knob is screwed down to bring it closer to the needle valve 172, the spring washers 178 bend so as not to exert an excessive pressure of the plastic piston element 174 against the needle valve 172.

However, when the knob 158 is turned in the opposite direction so that the spring washers 178 return to their normal dished condition, further movement of the knob 158 away from the needle valve 172 relieves the plastic piston element 164 of all pressure and permits it to move toward the right in FIGURE 1 under the influence of pressure from the regulating pressure chamber 110. This pressure is exerted through a passage 182 which puts the regulating pressure chamber 110 in direct communication with the space in the fitting 146 on the left-hand side of the plastic piston element 164.

There is a branch passage 183 through which the gas from the passage 182 flows into the space around the needle valve 172. When the piston element 164 moves away from the needle valve 172 to open the gas passage 170, gas flows out through the passage 170, the hollow interior of the plastic piston element 164 and through the center portion 176 of the backing plate 174. The center portion of the knob 158 has an opening 186 for the escape of the gas into the atmosphere.

At the inner end of the stem of the needle valve 172 there is a poppet valve 188 which seats against a plastic insert 190. This prevents the escape of gas from a pilot valve chamber 192 to which gas is supplied from the inlet passage 22 (FIGURE 1) through a passage 196, strainer 198, passage 200 and connecting passage 202.

Beyond the valve element 188 (FIGURE 4), the stem of the needle valve assembly has a substantially cylindrical portion 208 which slides in a bore 210 in a bushing 212 screwed into the left-hand end of the fitting 146. A spring 214 compressed between an end wall of the bushing 212 and the left-hand face of the piston portion 208 urges the poppet valve 188 toward the seat on the plastic insert 190.

When the fluid pressure on the left of the plastic piston element 164 (FIGURE 1) is not sufficient to overcome the force of the spring 178, the plastic piston element 164 contacts with the needle valve 178 and pushes the needle valve inwardly, toward the left in FIGURE 1. The poppet valve 188 is displaced from its seat on the plastic insert 190, and gas in the chamber 192 (FIGURE 4) flows past the open poppet valve 188 around the clearance between the piston portion 208 and through a slot in the circumference of this piston portion, and thence through the interior of the bushing 112 and out through an opening in the end of the bushing and into the sensing or regulating pressure chamber 110.

Pressure continues to build up in the regulating pressure chamber 110 as long as the poppet valve 188 is held open. When this pressure increases sufficiently to overcome the force of the spring 178, the plastic piston element 164 moves toward the right in FIGURE 1, and the needle valve 172 moves with it under the influence of the spring 214 (FIGURE 4) to permit the poppet valve 188 to close.

Whenever the regulator is to be adjusted for a lower sensing pressure, the knob 158 (FIGURE 1) is rotated in a direction to reduce the pressure of the spring 178 against the plastic piston element 164 so that fluid pressure in the chamber 110, acting through the passage 182, moves the piston element 164 to the left away from the needle valve 172 to permit escape of fluid past the needle valve, as already described.

A magnetically actuated pilot or other source of control pressure can be substituted for the pilot control shown in the drawing. This can be done by substituting a new end wall for the end wall 150, with different apparatus for supplying the pressure from a pilot carried by the end wall or from a remote source.

The FIGURE 3 shows the regulator connected with a compressed gas storage tank 220. The fitting 13 is connected to piping 222 which leads into a fitting 224 at one end of the tank 220. At another location on the tank 220, there is a fitting 226 to which the tube 124 is connected. With this construction, the pressure in the tank is transmitted through the tubing 124 to the fitting 122 which communicates with the bleed passage that supplies reduced pressure to the regulating pressure chamber. There is some lag between an increase in pressure in the regulator housing 10 and a corresponding increase in the compressed gas tank 220. The transmission of pressure back through the tubing 124 produces a lag which tends to damp the operation of the regulator and thus stabilizes it. This can be used as an aid to the needle valve 118, already described in connection with FIGURE 1, or can be used in place of the needle valve, and as the only communication through which gas at reduced pressure is supplied to the chamber 113.

The preferred embodiment of the invention has been illustrated and described, but changes and modifications can be made, and some features can be used in different combinations without departing from the invention as described in the claims.

What is claimed is:

1. A combination pressure regulator and relief valve for fluid at above atmospheric pressure comprising a housing with a main chamber therein, the housing having inlet, outlet, and vent passages communicating with the chamber, said outlet passage leading directly to the mid-portion of the chamber, and the others of said passages communicating with the chamber through openings having seat areas therein, a first valve head assembly movable toward and from said inlet seat area for commanding flow of gas through one of the openings, a second valve head assembly separate from the first valve head assembly and movable toward and from said vent seat area for commanding flow of gas through the other of said openings, the valve head assemblies confronting one another at opposite ends of the chamber, means urging each of the head assemblies into contact with their seat areas to close the openings to flow of fluid, an actuator extending through the valve head assemblies having shoulders facing in opposite directions in a position to abut against said head assemblies and the shoulders also being axially spaced along the actuator by a distance less than the spacing of the parts of the valve head assemblies with which the shoulders come in contact such that movement of the actuator in one direction moves said first valve head assembly to open position and movement of the actuator in the opposite direction moves said second valve head assembly to open position, a regulating pressure chamber having a movable wall therein, means on one side of said wall for biasing said movable wall and first valve head assembly to a valve open position, a motion transmitting connection between the wall and the actuator, and a communication passage leading from the outlet passage of the housing to the regulating pressure chamber on the other side of the movable wall so that an increase in fluid pressure moves the actuator in a direction to close the inlet head assembly and a further increase in fluid pressure effects further movement of the wall to move the actuator to open the valve head assembly that commands flow of fluid to the vent passage.

2. The pressure regulator described in claim 1 and in which there is a needle valve in the communication passage for damping the operation of the regulator.

3. The pressure regulator described in claim 1 and in which the actuator has an axial passage there through communicating with a space in the regulator behind one of the valve head assemblies for pressure balancing that head assembly, and a cross passage leading from said axial passage through a wall of the actuator at a location in the main chamber of the regulator.

4. The pressure regulator described in claim 1 and in which the communicating passage is a bleed passage, and there is a compressed gas storage tank connected by a conduit with the outlet passage of the regulator, and there is a second conduit connecting the interior of the storage tank with the bleed passage at a location intermediate the ends of said bleed passage.

5. The pressure regulator described in claim 1 and in which the movable wall is a piston in the regulating pressure chamber and there are means for supplying sensing pressure to, and withdrawing it from, the regulator pressure chamber on the side of the piston opposite the portion of the regulator pressure chamber into which the communicating passage from the outlet passage opens.

6. A pressure regulator comprising a housing with a main chamber therein, the housing having inlet, outlet and vent passages communicating with the chamber, one of said passages leading directly to the mid-portion of the chamber, and the other of said passages communicating with the chamber through openings having seat areas therein, a first valve head assembly movable toward and from the seat area for commanding flow of gas through one of the openings, a second valve head assembly movable toward and from the seat area for commanding flow of gas through the other of said openings, the valve head assemblies confronting one another at opposite ends of the chamber, means urging the head assemblies into contact with their seat areas to close the openings to flow of fluid, an actuator extending through the valve head assemblies and having shoulders that abut against said head assemblies for moving them away from the seat areas and into open positions, the shoulders being axially spaced along the actuator by a distance less than the spacing of the parts of the valve head assemblies with which the shoulders come in contact to move the head assemblies into open positions, a regulating pressure chamber having a movable wall therein, a motion transmitting connection between the wall and the actuator, and a communication passage leading from the outlet passage to the chamber on a side of the movable wall, to move the valve head assembly that commands flow of gas to the vent passage, and in which the seat areas at said openings are integral with the regulator housings, and there are bushings having cylindrical bearings in which the valve head assembly slides axially, there being a separate bushing for each of the valve head assemblies, and the housing having centering bearings concentric with the openings and into which the bushings fit to center them in alignment with each other and with the openings into the main chamber, and complementary screw threads on each of the bushings and in the regulator housing outward from the centering bearings for advancing the bushings through the centering bearings.

7. The pressure regulator described in claim 6 and in which there are bearings in the head assemblies in which the actuator is axially movable.

8. The pressure regulator described in claim 6 and in which each of the bushings has an end wall, and there is a spring in each bushing compressed between the end wall and the valve head assembly that slides within that bushing.

9. The pressure regulator described in claim 6 and in which there is a metal bearing for the actuator in the head assembly remote from the regulating pressure chamber, and there is another metal bearing for the actuator in an end wall of one of the bushings to hold the end of the seat assembly that is nearer to the regulating pressure chamber.

References Cited in the file of this patent
UNITED STATES PATENTS

| | | |
|---|---|---|
| 862,867 | Eggleston | Aug. 6, 1907 |
| 1,917,698 | Carson | July 11, 1933 |
| 2,091,874 | Neuhaus | Aug. 31, 1937 |
| 2,707,966 | Taplin | May 10, 1955 |
| 2,761,464 | Faust | Sept. 4, 1956 |
| 2,806,481 | Faust | Sept. 17, 1957 |
| 2,919,711 | Lord | Jan. 5, 1960 |
| 2,940,462 | Johanson | June 14, 1960 |
| 2,941,543 | Kleczek | June 21, 1960 |
| 2,950,730 | Svensson | Aug. 30, 1960 |
| 2,963,040 | Zimmer | Dec. 6, 1960 |